(12) United States Patent
Ganzel

(10) Patent No.: US 12,145,549 B2
(45) Date of Patent: Nov. 19, 2024

(54) UNLOADING VALVE AND BRAKE SYSTEM USING SAME

(71) Applicant: ZF Active Safety US Inc., Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 478 days.

(21) Appl. No.: 17/708,048

(22) Filed: Mar. 30, 2022

(65) Prior Publication Data

US 2023/0311832 A1    Oct. 5, 2023

(51) Int. Cl.
| | |
|---|---|
| B60T 8/26 | (2006.01) |
| B60T 13/68 | (2006.01) |
| B60T 15/36 | (2006.01) |
| F16K 11/22 | (2006.01) |

(52) U.S. Cl.
CPC .......... B60T 13/686 (2013.01); B60T 15/36 (2013.01); F16K 11/22 (2013.01)

(58) Field of Classification Search
CPC ......... B60T 13/686; B60T 15/36; F16K 11/22
USPC ..... 303/9.73, 9.75, 113.5, 119.2; 137/596.17
See application file for complete search history.

(56) References Cited

U.S. PATENT DOCUMENTS

| | | | | |
|---|---|---|---|---|
| 5,522,651 A | * | 6/1996 | Sorensen | B60T 8/4872 |
| | | | | 303/113.5 |
| 5,741,049 A | * | 4/1998 | Sorensen | B60T 8/348 |
| | | | | 303/113.5 |
| 9,827,960 B2 | | 11/2017 | Feigel et al. | |

FOREIGN PATENT DOCUMENTS

| | | |
|---|---|---|
| DE | 19882514 T1 | 7/2000 |
| DE | 69922468 T2 | 12/2005 |
| DE | 112010000851 B4 | 3/2020 |
| DE | 102018010168 A1 | 7/2020 |
| DE | 102022201733 A1 | 8/2023 |

OTHER PUBLICATIONS

German search report for corresponding Application No. 10 2023 202 533.7 dated Jun. 11, 2023 for applicant ZF Active Safety US Inc., pp. 1-8.

\* cited by examiner

*Primary Examiner* — Christopher P Schwartz
(74) *Attorney, Agent, or Firm* — Kristin L. Murphy

(57) ABSTRACT

An unloading valve is disclosed. A housing defines a primary and secondary pump inlets, and collective and bypass pump outlets. The housing defines a bypass seat. A tappet has first and second tappet ends longitudinally spaced by a tappet body. The tappet is configured for selective longitudinal reciprocal motion between first and second tappet positions. A tappet shoulder is located on an external surface of the tappet body for selective sealing engagement with the bypass seat to allow fluid flow in a bypass direction and resist fluid flow in a collection direction longitudinally opposite the bypass direction. The primary and secondary pump inlets are in fluid communication with the collective pump outlet for flow in the collection direction when the fluid pressure at the primary and secondary pump inlets combined is below a predetermined bypass pressure and the tappet is located in the first tappet position.

21 Claims, 3 Drawing Sheets

UNLOADING VALVE AND BRAKE SYSTEM USING SAME

TECHNICAL FIELD

This disclosure relates to an apparatus and method for use of an unloading valve and, more particularly, to a method and apparatus of a hydraulic brake system for actuating at least one wheel brake using an unloading valve.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Certain hydraulic brake systems include various supplemental features for selectively assisting with obtaining desired brake response for one or more wheel brakes in particular use environments. An example supplemental feature is the provision of additional fluid pressure, using a pump assist, in a brake system for a very large vehicle. This pump may be, for example, a motor-driven multi-piston pump. However, as pressures rise within the brake system, it may be desirable to selectively isolate one or more of the pistons from supplying pressurized hydraulic fluid to other components of the system, in order to supply the high fluid pressures desired for certain braking actions of the very large vehicle.

SUMMARY

In an aspect, an unloading valve is disclosed. A housing has a center bore extending longitudinally between a first housing surface and a second housing surface. The housing defines a primary pump inlet, a secondary pump inlet, a collective pump outlet, and a bypass pump outlet. The housing defines a bypass seat longitudinally between the secondary pump inlet and the bypass pump outlet. A tappet is contained within the center bore and has first and second tappet ends longitudinally spaced by a tappet body. The first tappet end is longitudinally adjacent the first housing surface and the second tappet end is longitudinally adjacent the second housing surface. The tappet is configured for selective longitudinal reciprocal motion within the center bore between first and second tappet positions responsive to fluid pressure at at least one of the primary and secondary pump inlets. The tappet includes an internal seat defined within a tappet bore longitudinally extending into the tappet body from the first tappet end. A tappet shoulder is located on an external surface of the tappet body for selective sealing engagement with the bypass seat to allow fluid flow in a bypass direction and resist fluid flow in a collection direction longitudinally opposite the bypass direction. At least one first tappet cross-aperture extends laterally through at least a portion of the tappet body at a location longitudinally spaced from the first tappet end with the internal seat interposed longitudinally therebetween. The first tappet cross-aperture is at least partially longitudinally aligned with, and places the tappet bore in fluid communication with, the secondary pump inlet. The first tappet cross-aperture is in selective fluid communication with the bypass pump outlet. At least a portion of the tappet bore is in fluid communication with the primary pump inlet and the collective pump outlet. A check ball is maintained within the tappet bore in selective sealing engagement with the internal seat. The check ball allows fluid flow in the collection direction and resists fluid flow in the bypass direction. The primary and secondary pump inlets are in fluid communication with the collective pump outlet via the first tappet cross-aperture for flow in the collection direction when the fluid pressure at the primary and secondary pump inlets combined is below a predetermined bypass pressure and the tappet is located in the first tappet position. When the fluid pressure at the primary and secondary pump inlets combined is at least one of at and above the predetermined bypass pressure, the check ball engages with the internal seat to resist fluid flow in the bypass direction and the tappet is located in the second tappet position to place the secondary pump inlet into fluid communication with the bypass pump outlet and to maintain fluid communication between the primary pump inlet and the collective pump outlet.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
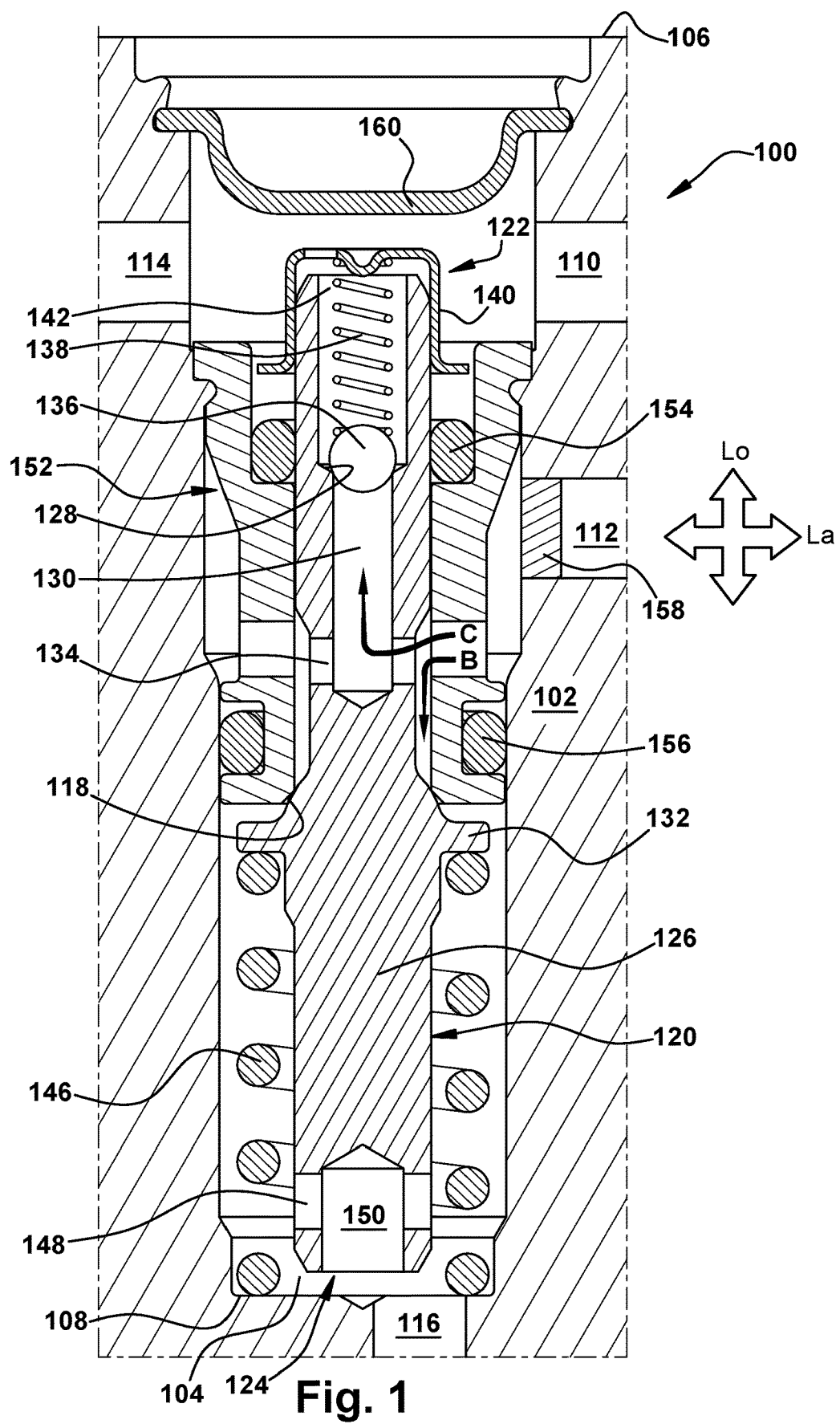
FIG. 1 is a schematic partial side view of an unloading valve according to an aspect of the present invention, in a first configuration.
Figures 2, 2A:
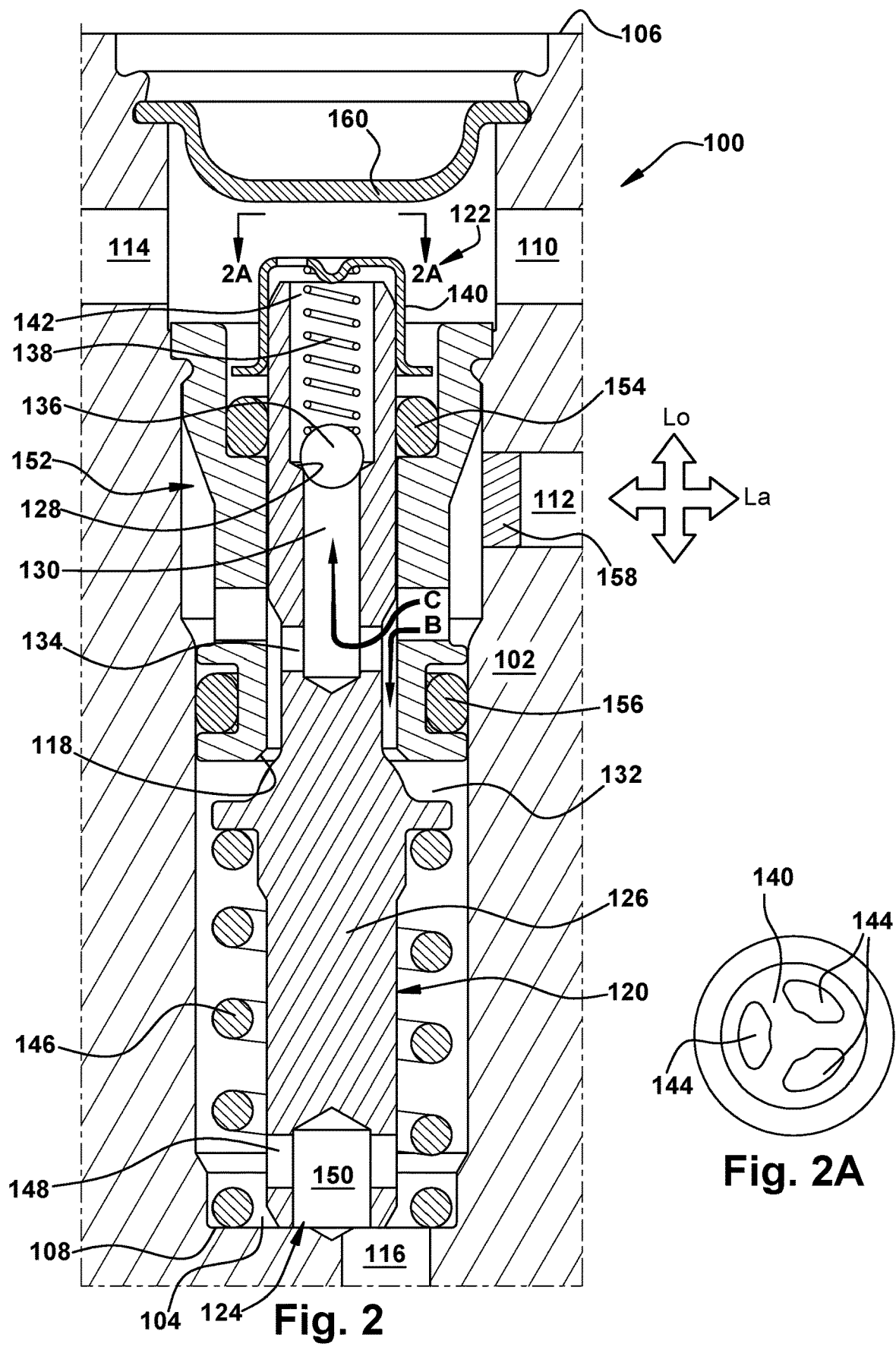
FIG. 2 is a schematic partial side view of the unloading valve of FIG. 1, in a second configuration.
FIG. 2A is a partial cross-sectional view taken along line 2A-2A of FIG. 1.

FIGS. 1-2A schematically depict an unloading valve 100 according to an aspect of the present invention. In FIG. 1, the unloading valve 100 is in a first, passive configuration. In FIG. 2, the unloading valve 100 is in a second, bypass configuration. The passive configuration allows hydraulic fluid to flow unimpeded to other portions of a brake system including the unloading valve 100. The bypass configuration routes a predetermined portion of hydraulic fluid into an "unloaded loop", as will be discussed further with reference to FIG. 3.

The unloading valve 100 includes a housing 102 having a center bore 104 extending longitudinally between a first housing surface 106 and a second housing surface 108. The "longitudinal" direction, as referenced herein, is substantially vertical, in the orientation of FIG. 1, and is represented by arrow Lo in the Figures. The housing 102 defines a primary pump inlet 110, a secondary pump inlet 112, a collective pump outlet 114, and a bypass pump outlet 116. These inlets and outlets provide fluid communication between the unloading valve 100 and other components of the brake system, and are shown schematically in the Figures. The absolute and relative locations of the inlets and outlets with respect to the housing 102 can be determined by one of ordinary skill in the art for a particular use environment. The housing 102 also defines a bypass seat 118 longitudinally between the secondary pump inlet 112 and the bypass pump outlet 116. When the unloading valve 100 is in the second, bypass configuration, hydraulic fluid from the secondary pump inlet 112 is directed to flow past the bypass seat 118 and out of the unloading valve 100 through the bypass pump outlet 116.

A tappet 120 is contained within the center bore 104 and has first and second tappet ends, 122 and 124, respectively, longitudinally spaced by a tappet body 126. The first tappet end 122 is longitudinally adjacent the first housing surface 106. The second tappet end 124 is longitudinally adjacent the second housing surface 108. The tappet 120 is configured for selective longitudinal reciprocal motion within the center bore 104 between first and second tappet positions (shown in FIG. 1 and FIG. 2, respectively) responsive to fluid pressure at at least one of the primary and secondary pump inlets 110 and 112.

The tappet 120 includes an internal seat 128 defined within a tappet bore 130 longitudinally extending into the tappet body 126 from the first tappet end 122. The tappet 120 also includes a tappet shoulder 132 located on an external surface 134 of the tappet body 126 for selective sealing engagement with the bypass seat 118 to selectively allow fluid flow in a bypass direction (shown schematically by arrow "B" in FIG. 1) and resist fluid flow in a collection direction (shown schematically by arrow "C" in FIG. 1), the collection direction being longitudinally opposite the bypass direction.

At least one first tappet cross-aperture 134 extends laterally through at least a portion of the tappet body 126 at a location longitudinally spaced from the first tappet end 122. The "lateral" direction, as referenced herein, is substantially horizontal, in the orientation of FIG. 1, is perpendicular to the longitudinal direction, and is represented by arrow La in the Figures. Optionally, and as shown in the Figures, the first tappet cross-aperture 134 may extend entirely laterally through the tappet body 126, at a diameter thereof or any other desired placement. The internal seat 128 is interposed longitudinally between (i.e., is located between along a longitudinally-oriented line) the first tappet cross-aperture 134 and the first tappet end 122. The first tappet cross-aperture 134 is at least partially longitudinally aligned with, and places the tappet bore 130 in fluid communication with, the secondary pump inlet 112. The term "longitudinally aligned" is used herein to indicate a condition wherein at least part of the structures are at a coordinated or overlapping position along a longitudinal axis, such that a line can be drawn along a lateral direction and intersect all of the "longitudinally aligned" structures. The first tappet cross-aperture 134 is in selective fluid communication with the bypass pump outlet 116, such as by directing fluid flow past the bypass seat 118. At least a portion of the tappet bore 130 is in fluid communication with the primary pump inlet 110 and the collective pump outlet 114.

A check ball 136 is maintained within the tappet bore 130 in selective sealing engagement with the internal seat 128. The check ball fluid flow in the collection direction 136 (vertically upward past the internal seat 128, in the orientation of FIG. 1) and resists fluid flow in the bypass direction (vertically downward past the internal seat 128, in the orientation of FIG. 1). As a result, when fluid pressure is higher toward the check ball 136 from the direction of the secondary pump inlet 112, fluid flow is permitted from the secondary pump inlet 112 to the collective pump outlet 114. Conversely, when fluid pressure is higher toward the check ball 136 from the direction of the primary pump inlet 110, the check ball 136 is held against the internal seat 128, preventing fluid from flowing vertically downward past the internal seat 128 from the primary pump inlet 110.

In other words, the primary and secondary pump inlets 110 and 112 are in fluid communication with the collective pump outlet 114 via the first tappet cross-aperture 134 for flow in the collection direction when the fluid pressure at the primary and secondary pump inlets 110 and 112 combined is below a predetermined bypass pressure and the tappet 120 is located in the first tappet position, as shown in FIG. 1.

Conversely, when the fluid pressure at the primary and secondary pump inlets 110 and 112 combined is at least one of at and above the predetermined bypass pressure, the check ball 136 engages with the internal seat 128 to resist fluid flow in the bypass direction. The tappet 120 is urged toward the second tappet position, shown in FIG. 2, via fluid flow downward, in the orientation of FIGS. 1-2. Fluid flow from the secondary pump inlet 112 travels in the bypass direction to exert pressure upon the portion of the tappet body 126 adjacent to the bypass seat 118. The tappet 120 then becomes located in the second tappet position, as shown in FIG. 2, to place the secondary pump inlet 112 into fluid communication with the bypass pump outlet 116. This "shuttling" of the tappet 120 from the first tappet position to the second tappet position can be accomplished by fluid pressure from one or both of the primary and secondary pump inlets 110, 112, though will be presumed in the below description to occur at least primarily in response to fluid pressure from the primary pump inlet 110. Presence of the tappet 120 in the second tappet position also allows the unloading valve 100 to maintain fluid communication between the primary pump inlet 110 and the collective pump outlet 114.

As a result, the tappet 120 shuttles upward and downward (in the orientation of FIGS. 1-2) to route fluid flow from the secondary pump inlet 112 to either the collective pump outlet 114 or the bypass pump outlet 116, depending upon whether the combined fluid pressure at the primary and secondary pump inlets 110 and 112 reaches the predetermined bypass pressure. The unloading valve 100 is a "passive", or unpowered, valve which does not require solenoid or other externally imposed control, but merely reacts to fluid pressures within the system containing the unloading valve 100.

With reference again to FIG. 1, check spring 138 may bias the check ball 136 into engagement with the internal seat 128 to resist fluid flow in the bypass direction. The check spring 138, when present, exerts longitudinally oriented compressive force between the check ball 136 and the direction of the first housing surface 106. The check spring 138 can be selected to provide the check ball 136 with a predetermined "cracking" pressure, to help tune the passive response of the unloading valve 100 as desired. That is, for some use environments of the unloading valve 100, the spring coefficient of the check spring 138 can be chosen so that when fluid pressure from the secondary pump inlet 112 is greater than fluid pressure from the primary pump inlet 110, the check ball 136 permits fluid flow thereby (from the secondary pump inlet 112 past the internal seat 128 in the collection direction, past the check spring 138, and to the collective pump outlet 114), and so that fluid flows in a damped/quiet manner during operation of the unloading valve 100.

Again, for some use environments of the unloading valve 100, when fluid pressure from the secondary pump inlet 112 is at least one of equal to and less than fluid pressure from the primary pump inlet 110, the check ball 136 is urged toward the internal seat 128 by the check spring 138 and fluid flow from the primary pump inlet 110. The check ball 136 resists flow past the internal seat 128 in the bypass direction. This causes fluid to flow from the secondary pump inlet 112 toward the tappet shoulder 132. At the same time, fluid pressure from the primary pump inlet 110 at least partially urges the tappet 120 toward the second tappet position of FIG. 2. It should be noted that fluid pressure exerted from the primary pump inlet 110 at least upon the check ball 136 and internal seat 128 (optionally, upon the entire sealing area of the tappet 120 out to the o-ring 154) will start urging the tappet 120 downward and permit fluid to flow into contact with the tappet shoulder 132. When the tappet 120 is in the second tappet position, fluid flow between the tappet shoulder 132 and bypass seat 118 egresses the unloading valve 100 via the bypass pump outlet 116.

When the check ball 136 is resisting fluid flow in the bypass direction and the tappet 120 is shuttled into the second tappet position, fluid still flows from the primary pump inlet 110 to egress the housing via the collection pump outlet 114. As a result, when high pressure is desired to be developed into the brake system downstream of the collection pump outlet 114, fluid from the primary pump inlet 110 is directed toward that portion of the brake system.

A cup-shaped cage 140 having an internal cage cavity 142 for receiving the first tappet end 122 therein may be provided, as shown in FIG. 1, to act as a spring retainer and maintain the check spring 138 in compressive engagement with the check ball 134. When present, the cage 140 may be in direct or indirect contact with at least a portion of the housing 104 for transmitting forces from the cage 140 to the housing 104. FIG. 2A is a schematic top view of the cage 140, showing a plurality of cage openings 144 which permit fluid flow therethrough from the tappet bore 130 (normally originating at the secondary pump inlet 112) to egress the unloading valve via collective pump outlet 114.

Again with reference to FIG. 1, the unloading valve 100 may include a tappet spring 146 biasing the tappet 120 toward the first tappet position and the tappet shoulder 132 area into engagement with the bypass seat 118. The tappet spring 146 exerts longitudinally oriented compressive force between the tappet shoulder 132 and the second housing surface 108, directly or indirectly. When fluid pressure from the secondary pump inlet 112 is at least one of equal to and less than fluid pressure from the primary pump inlet 110, the check ball 136 is urged toward the internal seat 128 at least partially by fluid flow from the primary pump inlet 110, as previously mentioned. In this situation, the check ball 136 resists flow past the internal seat 128 in the bypass direction, and fluid pressure from the primary pump inlet 110 pushes upon at least the check ball 136 and internal seat 128 to overcome the tappet spring 146 and thereby urge the tappet 120 toward the second tappet position of FIG. 2. Fluid flow between the tappet shoulder 132 area and bypass seat 118 flows through the tappet spring 146 area and egresses the unloading valve 100 via the bypass pump outlet 116.

The tappet 120 may include at least one second tappet cross-aperture 148 extending laterally through at least a portion of the tappet body 126 at a location longitudinally adjacent to the second tappet end 124 and spaced longitudinally apart from the tappet shoulder 118. The second tappet cross-aperture 148 may extend substantially laterally through part or all of the tappet body 126, at a diameter or any other placement thereof. The second tappet cross-aperture 148, when present, may be in fluid communication with a blind end of a tappet bypass aperture 150 extending partially into the tappet body 126 from the second tappet end 124. The second tappet cross-aperture 148 and tappet bypass aperture 150 collectively allow fluid flow therethrough from the secondary pump inlet 112, between the bypass seat 118 and the tappet shoulder 132 toward the bypass pump outlet 116.

A seat sleeve 152 may be located in the center bore 104 of the housing 102 to maintain the tappet 120 in spaced relationship therewith. A longitudinal portion of the tappet 120 (including the tappet bore 130) is at least partially enclosed within the seat sleeve 152 and is guided thereby for selective longitudinal reciprocating motion with respect to the center bore 104 between the first and second tappet positions. It is contemplated that, in addition to or instead of a seat sleeve 152, and interior surface of the center bore 104 could be shaped or profiled to provide a similar guiding feature.

A first o-ring 154 may laterally surround a portion of the tappet 120 including the tappet bore 130 for at least partially preventing fluid flow past an outer surface of the tappet 120 within the central bore 104. When the seat sleeve 152 is present, the first o-ring 154 may be at least partially interposed laterally between the tappet 120 and the seat sleeve 152 for at least partially preventing fluid flow past an outer surface of the tappet 120 within the seat sleeve 154. A second o-ring 156 may laterally surround laterally surround a portion of the seat sleeve 152, when present, adjacent the bypass seat 118 for preventing fluid flow past an outer surface of the seat sleeve 152 within the central bore 104.

At least one of the primary pump inlet 110, secondary pump inlet 112, collective pump outlet 114, and bypass pump outlet 116 may include a filter 158 for filtering fluid flow therethrough. The filter 158 is schematically shown in the Figures as being located in a "mouth" of the secondary pump inlet 112, at the point where the inlet intersects the center bore 104. It is contemplated, though, that a suitable filter 158 could be located in any desired position within, adjacent, or spaced from the unloading valve 100, as desired for a particular use application of the unloading valve 100.

The housing 102 may include an end cap 160 adjacent the first housing surface 106, longitudinally spaced from the tappet 120. The end cap 160, when present, may be operative to at least partially enclose the center bore 104 for maintaining the remaining components of the unloading valve 100 within the housing 102 in a substantially fluidtight manner. The end cap 160 may be configured, installed, and retained in position in any desired manner.

Figure 3:
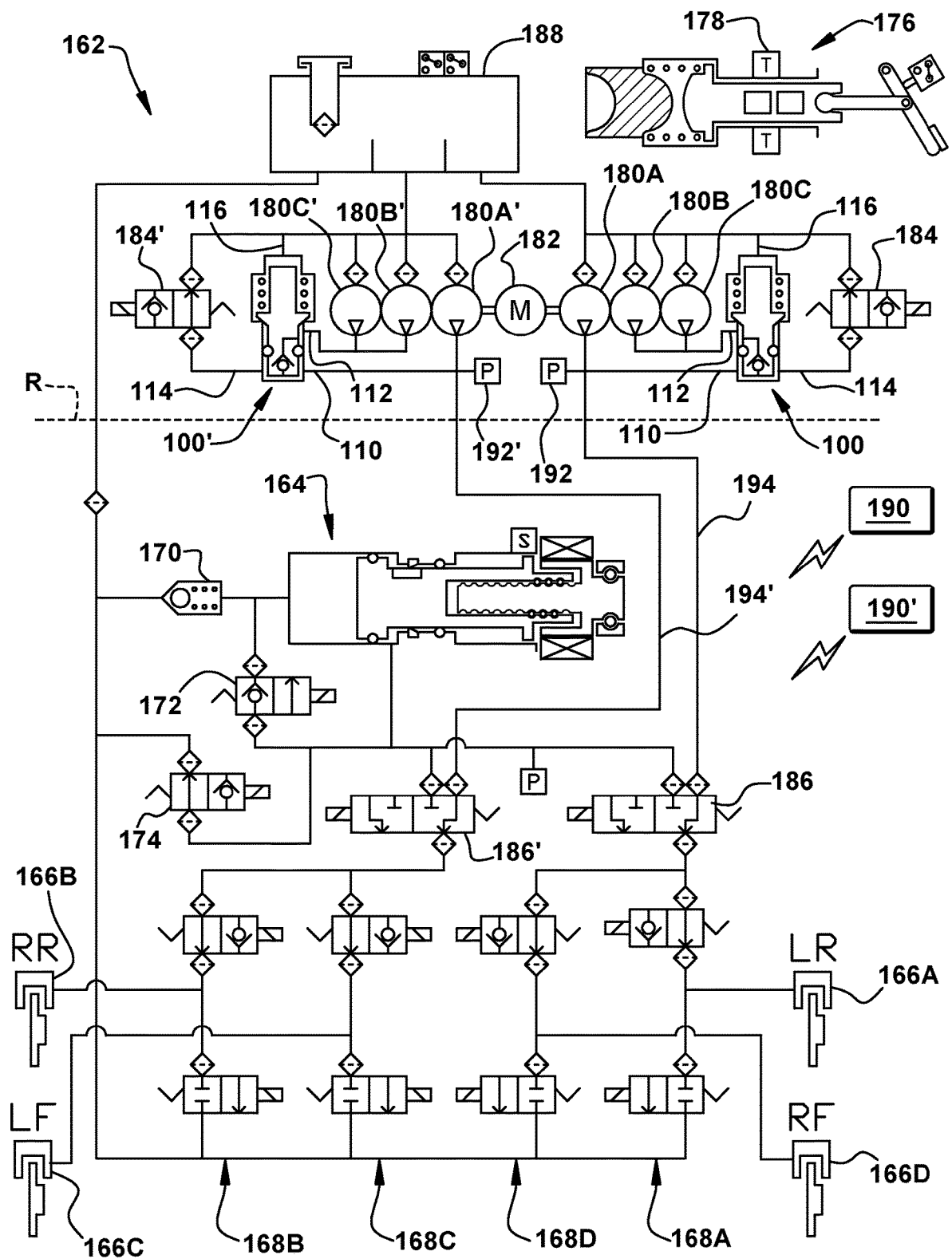
FIG. 3 is a schematic hydraulic diagram of an example brake system including the unloading valve of FIG. 1.

FIG. 3 is a schematic depiction of a brake system 162 which includes at least one unloading valve 100. The brake system 162, or components thereof, may be or resemble, as one nonlimiting example, one or more of the brake systems shown and described in copending U.S. patent application Ser. No. 17/366,623, titled "Apparatus and Method for Redundant Control of a Hydraulic Brake System", filed 2 Jul. 2021 and incorporated herein by reference in its entirety for all purposes.

The brake system 162 of FIG. 3 includes a source of pressurized hydraulic fluid 164, a plurality of wheel brakes 166 (four shown as 166A-166D), and an iso/dump control valve arrangement 168 (four shown as 168A-168D) associated with each wheel brake 166A-166D of the plurality of wheel brakes 166. In some use environments, and as shown in FIG. 3, the source of pressurized hydraulic fluid 162 may be a dual-acting plunger ("DAP") unit. As shown, the brake system 162 with a DAP includes a replenishing check valve 170 and at least one DAP valve (here, normally closed DAP valve 172 and normally open DAP valve 174) for directing hydraulic fluid in a predetermined arrangement with respect to the dual-acting plunger unit type source of pressurized hydraulic fluid 164.

A brake pedal assembly or other deceleration signal transmitter 176 (manual, autonomous, or automatic) may be provided to generate a braking command signal in any desired manner. For example, when the deceleration signal transmitter 176 includes a traditional brake pedal, a brake travel sensor 178 may be operative to detect travel of the brake pedal responsive to an operator's foot pressure and thereby provide a braking command signal indicative of a desired braking action.

A set of pump pistons 180 may be provided to the brake system 162. The set of pump pistons 180 is associated with at least one wheel brake (shown here as being associated with at least two wheel brakes) 166 of the plurality of wheel brakes 166. The set of pump pistons 180 is driven by an electric motor 182 for selectively providing pressurized hydraulic fluid to the iso/dump control valve arrangement 168 of the wheel brakes 166 which are associated with that particular set of pump pistons 180. In FIG. 3, three pump pistons 180A, 180B, and 180C are provided as a first set of pump pistons 180, associated with wheel brakes 166A and 166D. Similarly, three pump pistons 180A', 180B', and 180C' are provided as a second set of pump pistons 180', associated with wheel brakes 166B and 166C. Element numbers referenced herein as being appended with a "prime" mark indicate a second, similarly configured component to the like-numbered element with no "prime" mark, for the sake of brevity. While the brake system 162 of FIG. 3 includes two "sides" of the circuit, as a diagonal split arrangement, one of ordinary skill in the art will understand that a simpler and less expensive brake system 162 could be provided with only a single instance of each duplicated component (again, as indicated with a "prime" mark on the element number).

In the arrangement of FIG. 3, a single electric motor 182 drives all six pump pistons of the brake system 162, though it is contemplated that multiple electric motors (not shown) could be provided as desired. The brake system 162 could include any desired number of pump pistons 180, though it is contemplated that at least two pump pistons 180 will be provided to the brake system 162, for unloading and bypass functions as described herein. The dashed line "R" in FIG. 3 signifies that the electric motor 182, pump pistons 180, reservoir 188, and related components located "above" line R (in the orientation of FIG. 3) could be located remotely from other components of the brake system 162, such as in an under-hood unit spaced apart from the remaining, "below" line R, components shown in FIG. 3.

Each set of pump pistons 180, 180' may include at least one primary piston 180A, 180A' fluidly connected to the primary pump inlet 110 of the respective unloading valve 100, 100' and at least one secondary piston (two shown for each set of pump pistons 180, 180', as 180B, 180B' and 180C, 180C') fluidly connected to the secondary pump inlet 112 of the unloading valve 100, 100'.

The brake system 162 includes at least one unloading valve (two shown and labeled as 100, 100') as shown and described herein with reference to FIGS. 1-2A. Each unloading valve 100, 100' is operatively hydraulically connected to a respective set of pump pistons 180, 180' for selectively operating the set of pump pistons 180, 180' in a bypass mode.

An iso pump valve 184, 184' is operatively hydraulically connected to each set of pump pistons 180, 180' and the corresponding unloading valve 100, 100' for selectively operating the set of pump pistons 180, 180' in a bypass mode.

A two-position three-way valve 186, 186' is associated with at least two wheel brakes 166 of the plurality of wheel brakes 166. The two-position three-way valve 186, 186' is configured to selectively route hydraulic fluid to the associated wheel brakes 166 from the source of pressurized hydraulic fluid 164 in a first braking mode and from a corresponding set of pump pistons 180, 180' in a second braking mode.

A reservoir 188 is hydraulically connected to the source of pressurized fluid 164 and to the set(s) of pump pistons 180, 180'. An electronic control unit 190 is operative to control at least one of the electric motor 182, the iso pump valve 184, 184', and at least one iso/dump control valve arrangement 168, responsive to the braking command signal generated by the deceleration signal transmitter 176 or any other desired provider of a braking command signal.

For some use environments of the brake system 162, the electronic control unit 190 may be a first electronic control unit 190 operative to control at least one of the electric motor 182, the iso pump valve 184, 184', and at least one iso/dump control valve arrangement 168. The brake system 162 may also include a second electronic control unit 190' operative to control at least one of the source of pressurized hydraulic fluid 164, the two-position three-way valve(s) 186, 186', any provided DAP valve(s) 172, 174, and at least one of the iso/dump control valve arrangements 168. It is contemplated that at least one of the iso/dump control valve arrangements (here, 168A, 168B as associated with the rear wheel brakes) may include dual wound coils for control by either one of the first and second electronic control units 190, 190' at different times, for redundancy.

A pressure sensor 192 may be operatively coupled to the set of pump pistons 180, 180' and the unloading valve 100, 100'. When present, the pressure sensor 192 may produce a pressure signal responsive to a sensed pressure in a supply channel 194, 194' extending hydraulically between the two-position three-way valve 186, 186' and the set of pump pistons 180, 180'. At least one electronic control unit 190, 190' controls a selected one of the iso pump valves 184, 184' to place the unloading valve 100, 100' in the bypass mode responsive to the pressure signal from the pressure sensor 192.

When each set of pump pistons 180, 180' is in a collection mode, the unloading valve 100, 100' and iso pump valve 184, 184' are controlled to route hydraulic fluid from at least one pump piston of the set of pump pistons 180, 180' through each of the primary and secondary pump inlets 110, 112 to the collection outlet 114 of the unloading valve 100, 100'. For example, this may occur when the collective fluid pressure at the primary and secondary pump inlets 110, 112 is less than a predetermined bypass pressure, and/or when fluid pressure into the unloading valve 100, 100' from the secondary pump inlet 112 is greater than fluid pressure into the unloading valve 100, 100' from the primary pump inlet 110. In some use environments, for example, the bypass pressure may be in the range of about thirty to ninety bar, such as about fifty to seventy bar, such as, more specifically, about sixty bar. As a result, the unloading valve 100, 100' operates to aggregate the fluid pressure from all of the pump pistons of each corresponding set of pump pistons 180, 180' during the collection mode. This collection mode may occur during normal non-failure braking or as a backup braking (redundant) source of pressurized hydraulic fluid.

However, and particularly if the brake system 162 is on a very large, heavy vehicle, it may be desirable to quickly provide high braking pressures (i.e., above the predetermined bypass pressure), to either assist with normal braking (from the source of pressurized fluid 164 or in a backup mode, when the source of pressurized fluid 164 is not available. As the pressure need grows, the current draw by the electric motor 182 rises in order to power each pump piston 180 and can become undesirably large. Therefore, the unloading valve 100, 100' is permitted to enter a bypass mode—with the tappet 120 in the second tappet position—to place the secondary pump piston(s) 180B, 180B' and 180C, 180C' into a pressure unloaded closed-loop flow configuration, optionally with the assistance of the iso pump valve 184.

More specifically, when the set of pump pistons 180, 180' is in the bypass mode, the unloading valve 100, 100' and iso pump valve 184, 184' are controlled to route hydraulic fluid from at least a chosen pump piston 180A, 180A' of the set of pump pistons through the primary pump inlet 110 to the collection outlet 114 and from at least one other pump piston 180B, 180B' and/or 180C, 180C' of the set of pump pistons through the secondary pump inlet 112 to the bypass outlet 116 for return to the at least one other pump piston 180B, 180B' and/or 180C, 180C'. Accordingly, the "secondary" pump pistons 180B, 180B' and/or 180C, 180C' which are in fluid communication with the secondary pump inlet 112 are placed into a simple recirculating loop—"parked", in a manner of speaking—through the bypass outlet 116 of the unloading valve 100, 100' which then leads right back to the inlet of those same "secondary" pump pistons 180B, 180B' and/or 180C, 180C'. The primary pump piston 180A, 180A' continues to route pressurized hydraulic fluid into the primary pump inlet 110 and out of the unloading valve 100, 100' through the collection outlet 114. By "unloading" the secondary pump pistons 180B, 180B' and 180C, 180C', pressurized "working" hydraulic fluid is made available to the rest of the brake system 162 at relatively high pressures without requiring the high current draw for the electric motor 182 as would be needed if all of the pump pistons 180 were to be actively providing the high-pressure fluid.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An unloading valve, comprising:
   a housing having a center bore extending longitudinally between a first housing surface and a second housing surface, the housing defining a primary pump inlet, a secondary pump inlet, a collective pump outlet, and a bypass pump outlet, and the housing defining a bypass seat longitudinally between the secondary pump inlet and the bypass pump outlet;
   a tappet contained within the center bore and having first and second tappet ends longitudinally spaced by a tappet body, the first tappet end being longitudinally adjacent the first housing surface and the second tappet end being longitudinally adjacent the second housing surface, the tappet being configured for selective longitudinal reciprocal motion within the center bore between first and second tappet positions responsive to fluid pressure at at least one of the primary and secondary pump inlets, the tappet including:
     an internal seat defined within a tappet bore longitudinally extending into the tappet body from the first tappet end,
     a tappet shoulder located on an external surface of the tappet body for selective sealing engagement with the bypass seat to allow fluid flow in a bypass direction and resist fluid flow in a collection direction longitudinally opposite the bypass direction, and
     at least one first tappet cross-aperture extending laterally through at least a portion of the tappet body at a location longitudinally spaced from the first tappet end with the internal seat interposed longitudinally therebetween,
     wherein the first tappet cross-aperture is at least partially longitudinally aligned with, and places the tappet bore in fluid communication with, the secondary pump inlet,
     wherein the first tappet cross-aperture is in selective fluid communication with the bypass pump outlet, and
     wherein at least a portion of the tappet bore is in fluid communication with the primary pump inlet and the collective pump outlet; and
   a check ball maintained within the tappet bore in selective sealing engagement with the internal seat, the check ball allowing fluid flow in the collection direction and resisting fluid flow in the bypass direction;
   wherein the primary and secondary pump inlets are in fluid communication with the collective pump outlet via the first tappet cross-aperture for flow in the collection direction when the fluid pressure at the primary and secondary pump inlets combined is below a predetermined bypass pressure and the tappet is located in the first tappet position; and wherein
   when the fluid pressure at the primary and secondary pump inlets combined is at least one of at and above the predetermined bypass pressure, the check ball engages with the internal seat to resist fluid flow in the bypass direction and the tappet is located in the second tappet position to place the secondary pump inlet into fluid communication with the bypass pump outlet and to maintain fluid communication between the primary pump inlet and the collective pump outlet.

2. The unloading valve of claim 1, including a check spring biasing the check ball into engagement with the internal seat to resist fluid flow in the bypass direction, the check spring exerting longitudinally oriented compressive force between the check ball and the direction of the first housing surface.

3. The unloading valve of claim 2, wherein, when fluid pressure from the secondary pump inlet is at least one of equal to and less than fluid pressure from the primary pump inlet, the check ball is urged toward the internal seat by the check spring and fluid flow from the primary pump inlet, the check ball resisting flow past the internal seat in the collection direction, fluid pressure from the primary pump inlet urging the tappet toward the second tappet position;
   wherein fluid flow between the tappet shoulder and bypass seat egresses the unloading valve via the bypass pump outlet.

4. The unloading valve of claim 3, wherein, when the check ball resists fluid flow in the bypass direction, fluid flows from the primary pump inlet to egress the housing via the collection pump outlet.

5. The unloading valve of claim 2, including a cup-shaped cage having an internal cage cavity for receiving the first tappet end therein to maintain the check spring in compressive engagement with the check ball.

6. The unloading valve of claim 2, wherein, when fluid pressure from the secondary pump inlet is greater than fluid pressure from the primary pump inlet, the check ball permits fluid flow thereby from the secondary pump inlet past the internal seat in the collection direction, past the check spring, and to the collective pump outlet.

7. A brake system, comprising:
   a source of pressurized hydraulic fluid;
   a plurality of wheel brakes;
   an iso/dump control valve arrangement associated with each wheel brake of the plurality of wheel brakes;
   a set of pump pistons, the set of pump pistons being associated with at least one wheel brake of the plurality of wheel brakes, the set of pump pistons being driven by an electric motor for selectively providing pressurized hydraulic fluid to the iso/dump control valve arrangement of the associated wheel brake;
   an unloading valve according to claim 1, the unloading valve being operatively hydraulically connected to the set of pump pistons for selectively operating the set of pump pistons in a bypass mode;
   an iso pump valve operatively hydraulically connected to the set of pump pistons and the unloading valve for selectively operating the set of pump pistons in a bypass mode;

a two-position three-way valve associated with at least one wheel brake of the plurality of wheel brakes, the two-position three-way valve being configured to selectively route hydraulic fluid to the associated wheel brake from the source of pressurized hydraulic fluid in a first braking mode and from the set of pump pistons in a second braking mode;

a reservoir hydraulically connected to the source of pressurized fluid and to the set of pump pistons; and an electronic control unit operative to control the electric motor, and the iso pump valve;

wherein, when the set of pump pistons is in a collection mode, the unloading valve and iso pump valve are controlled to route hydraulic fluid from at least one pump piston of the set of pump pistons through each of the primary and secondary pump inlets to the collection outlet; and wherein, when the set of pump pistons is in the bypass mode, the unloading valve and iso pump valve are controlled to route hydraulic fluid from at least a chosen pump piston of the set of pump pistons through the primary pump inlet to the collection outlet and from at least one other pump piston of the set of pump pistons through the secondary pump inlet to the bypass outlet for return to at least one pump piston.

8. The brake system of claim 7, wherein the electronic control unit is a first electronic control unit operative to control the electric motor, the iso pump valve; and the brake system includes a second electronic control unit operative to control the source of pressurized hydraulic fluid, the two-position three-way valve, and at least one of the iso/dump control valve arrangements.

9. The brake system of claim 7, wherein the source of pressurized hydraulic fluid is a dual-acting plunger unit, and the brake system includes a replenishing check valve and at least one DAP valve for directing hydraulic fluid in a predetermined arrangement with respect to the dual-acting plunger unit.

10. The brake system of claim 7, wherein the set of pump pistons includes at least one primary piston fluidly connected to the primary pump inlet of the respective unloading valve and at least one secondary piston fluidly connected to the secondary pump inlet of the unloading valve.

11. The brake system of claim 7, including a pressure sensor operatively coupled to the set of pump pistons and the unloading valve, the pressure sensor producing a pressure signal responsive to a sensed pressure in a supply channel extending hydraulically between the two-position three-way valve and the set of pump pistons, the electronic control unit controlling the iso pump valve to place the unloading valve in the bypass mode responsive to the pressure signal from the pressure sensor.

12. The brake system of claim 7, wherein the set of pump pistons is a first set of pump pistons, the unloading valve is a first unloading valve, the iso pump valve is a first iso pump valve, the two-position three-way valve is a first two-position three-way valve, and wherein the brake system includes a second set of pump pistons, a second unloading valve, a second iso pump valve, and a second two-position three-way valve, wherein the first set of pump pistons is operatively connected, through the first unloading valve, the first iso pump valve, and the first two-position three-way valve to at least one chosen wheel brake of the plurality of wheel brakes, and wherein the second set of pump pistons is operatively connected, through the second unloading valve, the second iso pump valve, and the second two-position three-way valve to at least one other wheel brake of the plurality of wheel brakes.

13. The unloading valve of claim 1, wherein a seat sleeve is located in the center bore of the housing to maintain the tappet in spaced relationship therewith, a longitudinal portion of the tappet including the tappet bore being at least partially enclosed within the seat sleeve and guided thereby for selective longitudinal reciprocating motion with respect to the center bore between the first and second tappet positions.

14. The unloading valve of claim 13, wherein a first o-ring laterally surrounds a portion of the tappet including the tappet bore for at least partially preventing fluid flow past an outer surface thereof within the seat sleeve.

15. The unloading valve of claim 13, wherein a second o-ring laterally surrounds a portion of the seat sleeve adjacent the bypass seat for at least partially preventing fluid flow past an outer surface of the seat sleeve within the central bore.

16. The unloading valve of claim 1, including a tappet spring biasing the tappet toward the first tappet position and the tappet shoulder area into engagement with the bypass seat, the tappet spring exerting longitudinally oriented compressive force between the tappet shoulder and the second housing surface.

17. The unloading valve of claim 16, wherein, when fluid pressure from the secondary pump inlet is at least one of equal to and less than fluid pressure from the primary pump inlet, the check ball is urged toward the internal seat at least partially by fluid flow from the primary pump inlet, the check ball resisting flow past the internal seat in the bypass direction, causing fluid pressure from the primary pump inlet to urge the tappet toward the second tappet position;

wherein fluid flow between the tappet shoulder and bypass seat egresses the unloading valve via the bypass pump outlet.

18. The unloading valve of claim 1, wherein at least one of the primary pump inlet, secondary pump inlet, collective pump outlet, and bypass pump outlet includes a filter for filtering fluid flow therethrough.

19. The unloading valve of claim 1, wherein a first o-ring laterally surrounds a portion of the tappet including the tappet bore for at least partially preventing fluid flow past an outer surface thereof within the central bore.

20. The unloading valve of claim 1, wherein the housing includes an end cap adjacent the first housing surface, longitudinally spaced from the tappet.

21. The unloading valve of claim 1, wherein the tappet includes at least one second tappet cross-aperture extending laterally through at least a portion of the tappet body at a location longitudinally adjacent to the second tappet end and spaced longitudinally apart from the tappet shoulder, wherein the second tappet cross-aperture is in fluid communication with a blind end of a tappet bypass aperture extending partially into the tappet body from the second tappet end, the second tappet cross-aperture and tappet bypass aperture collectively allowing fluid flow therethrough from between the bypass seat and the tappet shoulder toward the bypass pump outlet.

* * * * *